United States Patent Office 3,823,054
Patented July 9, 1974

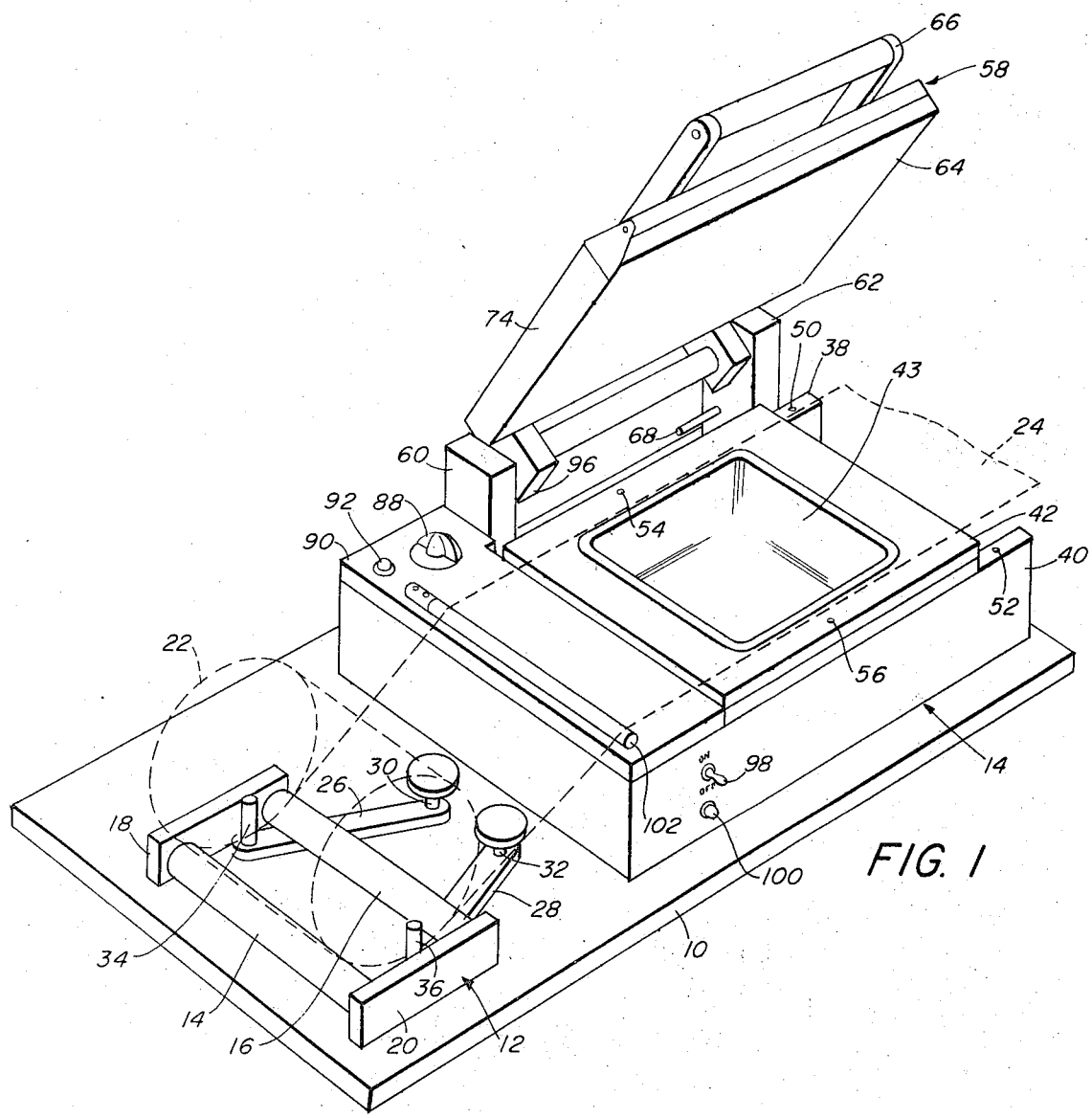
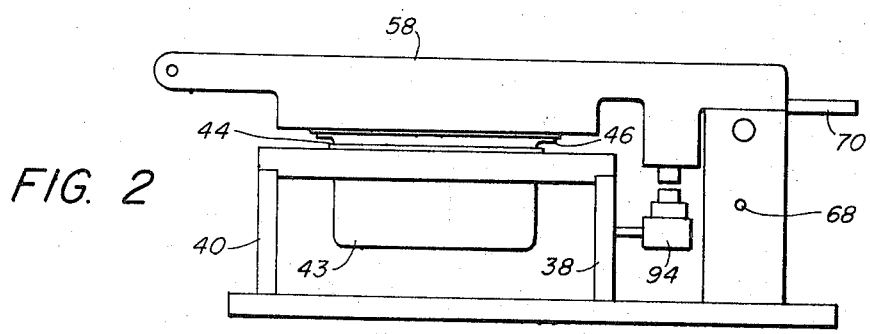

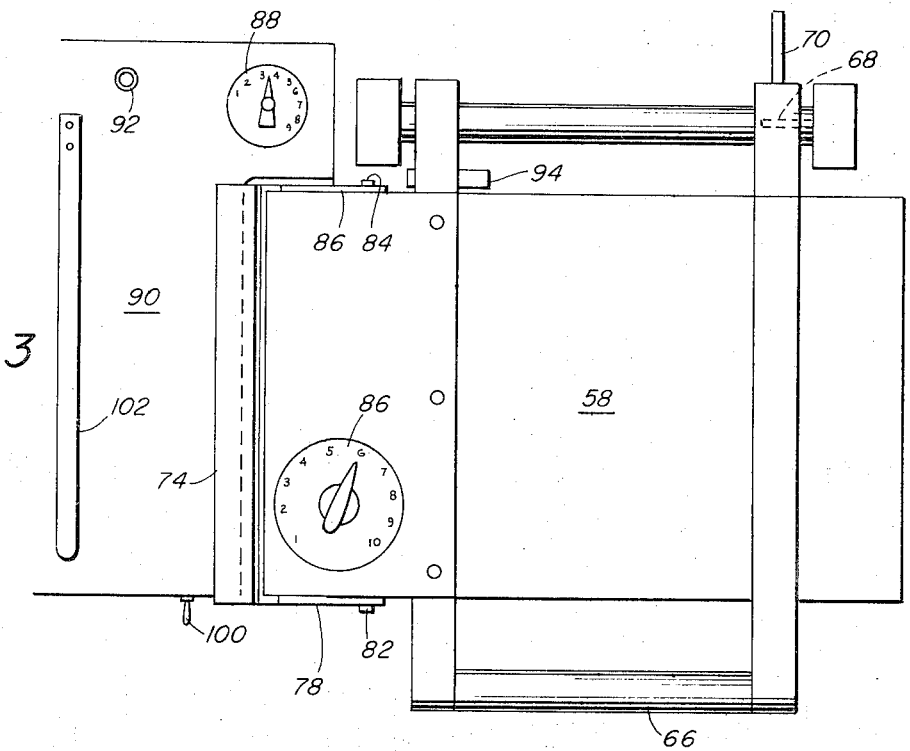
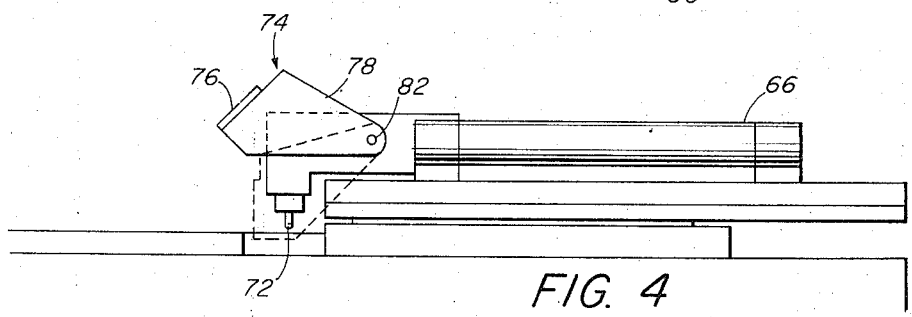
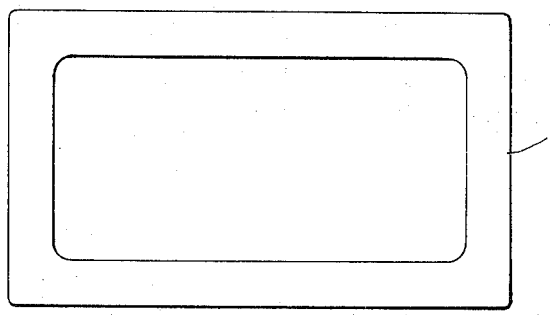

3,823,054
APPARATUS FOR HEAT-SEALING PACKAGES
Winton E. Balzer, 963 Central Ave., Needham, Mass. 02192, and Kenneth M. Knobel, 37 Percy Road, Lexington, Mass. 02173
Filed Feb. 9, 1972, Ser. No. 224,689
Int. Cl. B32b 31/00; B65b 7/06
U.S. Cl. 156—530                                    7 Claims

ABSTRACT OF THE DISCLOSURE

An apparatus is provided for heat-sealing a thermoplastic film onto the top of a tray containing food or the like. A hinged cover is provided with an oversized heating pad and is adapted to be lowered onto the film which has been drawn over a tray held in a cooperating die to heat-seal the film marginally to the tray. The dies are changeable to accommodate different sizes and shapes of trays while the same pad may be used throughout. A heated wire enclosed by a retractable shield cuts the film simultaneously with the heat-sealing operation to separate the film from the roll. A roll of film is mounted adjacent the sealing station in a cradle comprised of rollers with adjustable guides for positioning rolls of different sizes with respect to the die. Controls are provided for adjusting the temperature and the timing cycles according to the materials used.

BACKGROUND OF THE INVENTION

1. Field of the Invention

This invention relates generally to heat-sealing equipment for thermoplastic materials and more particularly is directed towards a new and improved apparatus for sealing thermoplastic film onto a packaging tray.

2. Description of the Prior Art

In the packaging industry, molded trays covered by a thermoplastic film are becoming increasingly popular in connection with food products since they permit foods to be easily packaged in measured amounts. Many of the films are transparent so that the food contents remain visible. In large food processing plants film is sealed over the tops of the trays by highly automated equipment which, while operated efficiently and at high speeds nevertheless involves expensive and complex machinery, not suitable for low volume or short run processing operations. Very often retail supermarkets, for example, will package certain meats and other foods in the store as a convenience to their customers. The volume requirements of such operations do not warrant highly automated equipment and normally such packaging operations are done largely on a manual basis using a heated iron or other tool to carry out the heat sealing operations.

Accordingly, it is an object of the present invention to provide a simple, low cost apparatus for heat sealing a thermoplastic film onto a tray. A further object of this invention is to provide a packaging apparatus adapted to accommodate trays of a variety of sizes and shapes onto which thermoplastic film may be quickly and easily sealed.

Summary of the Invention

This invention features an apparatus for heat sealing a thermoplastic film onto a tray, comprising a base adapted to receive replaceable tray-holding dies in a variety of sizes and shapes, an oversize heated platen movable to and away from the die, a roller support adjacent the die base adapted to permit a section of film to be drawn manually over the top of the die and below the platen whereby the film section may be sealed to the tray by moving the platen down into a heat-sealing position. Controls are provided for controlling temperature and time dwell and guides provide proper tracking of the film with respect to the die. A heated wire is adjacent the platen and enclosed by a retractable guard to sever the film on each cycle of operation.

Brief Description of the Drawings

FIG. 1 is a view in perspective of a heat-sealing apparatus made according to the invention,
FIG. 2 is a view in side elevation thereof,
FIG. 3 is a partial top plan view thereof,
FIG. 4 is a detail front elevation showing a severing wire and retractable guard, and,
FIG. 5 is a bottom plan view of a heated platen.

Detailed Description of the Preferred Embodiment

Referring now to the drawings, the apparatus is generally organized about a base plate 10 on which are mounted a feed roll dispenser 12 on one end and a heat-sealing stage 14 at the other end thereof. The dispenser 12 is comprised of a pair of parallel rollers 14 and 16 rotatably mounted by end plates 18 and 20 to form a cradle for a roll 22 of a heat-sealable thermoplastic film 24 which may be freely drawn therefrom. The roll 22 is dropped onto the cradle whenever a fresh supply of film is required.

In order to insure that the roll 22 does not wander lengthwise of the cradle and to insure proper tracking of the film drawn therefrom regardless of the width of the roll and the film, an adjustable roll guiding mechanism is provided. The mechanism includes a pair of arms 26 and 28, each pivoted to the base plate 10 by means of clamping screws 30 and 32. The opposite ends of the arms 26 and 28 each carries an upright roller 34 and 36 extending upwardly between the cradle rollers 14 and 16 to engage the opposite ends of the film roll 22. In practice, the arms are pivoted so that the rolls 36 and 38 are fully extended next to the end plates 18 and 20. The feed roll 22 is then dropped into the cradle and a length of film 24 is withdrawn from the roll. This length of film is properly aligned in the heat-sealing stage and, with the film and roll properly positioned, the arms 26 and 28 are swung into engagement with the ends of the feed roll 22. The clamping screws 30 and 32 are then tightened up to hold the arms and the rollers 34 and 36 in guiding position to prevent the roll 22 from wandering back and forth along the cradle rollers 14 and 16.

The film is drawn off by the operator to the right, as viewed in FIG. 1, into the heat-sealing station 14. The station 14 is comprised of a pair of upright, spaced parallel sidewalls 38 and 40, the wall 38 being mounted towards the rear longitudinal margin of the base plate 12 and the wall 40 being mounted towards the forward portion thereof. These walls are relatively high and serve to support a removable die 42 mounted thereon. The die 42 typically is of a square or rectangular configuration and may be machined or otherwise fabricated from a suitable die material such as aluminum, steel or the like and formed with a central opening dimensioned to snugly receive a packaging tray 43 deposited therein by the operator. The die opening is conformed to the outside dimensions of the tray and, preferably, the die is formed with a slightly raised ridge 44 (FIG. 2) about its opening to engage a lip 46 formed about the upper end of the tray 43. The walls 38 and 40 are made relatively high in order to accommodate trays of different depths, from those that are relatively shallow to those that are relatively deep. Also, the walls 38 and 40 are quite long so that dies of different lengths may be mounted in position in order to accommodate a variety of tray sizes and shapes. The upper edges of the walls 38 and 40 are formed with spaced sockets 50 and 52 adapted to receive set pins 54 and 56 which pass through the edges of the die 42 in order to maintain the die in position.

A hinged lid or cover 58 is mounted to upright frame members 60 and 62 at the rear of the wall 38 and to the base plate 10. The cover 58 is oversized and carries an oversized heated platen 64 which extends at least the full length and width of the open area defined by the side walls 38 and 40. In this fashion a single heated platen will accommodate any size die fitted to the walls 38 and 40, eliminating the need to change the platen whenever a change in tray size and die size is made. The cover 58 is provided with a forwardly extending handle 66 which is employed by the operator to raise and lower the motion of the cover during each cycle of sealing operations. In order to limit the motion of the cover when being raised, stop pins 68 and 70 are provided, the pin 68 extending inwardly from the frame member 62 while the pin 70 extends from the rear edge of the cover 58.

The heated platen 64, in the preferred embodiment, is fabricated of a resilient material such as a stratum of silicon rubber employing a sponge backing such as a ¼" pad of silicon rubber and an outer facing of fiberglass or the like which will not adhere to the heat-softened film 24 and provides a wrinkle-free seal all over the surface of the tray lip. Heating elements are imbedded in the pad to heat the entire surface thereof and thereby seal the film 24 interposed between the face of the platen 64 and the upper lip of the tray that has been positioned in the die opening. For special applications, it may be desirable not to heat the center portion of the film spanning the tray opening but only the marginal edges thereof. In such cases, the platen may be contoured as suggested in FIG. 5 to conform with the outline of the tray and heated only along those contour lines, whereby heat-sealing action will take place only between the lip of the tray and the film with no sealing heat applied to the center thereof.

In order to sever the leading section of film 24 that has been drawn from the roll and permit the removal of the tray to which a section of film has been sealed, a heated wire 72 is mounted along the left-hand edge of the cover as viewed in FIGS. 1, 3 and 4. The wire 72 extends slightly below the face of the platen 64 across the full width thereof in position to engage and heat sever the film 24 along he left-hand edge of the die. Thus, when the operator pulls a section of film over the top of the die in which a tray is mounted and pulls the cover down to heat-seal the film to the tray, simultaneously he will separate the heat-sealed section of film from the rest of the roll to allow a fresh section to be drawn into position during the next cycle of operation.

In order to protect the operator from accidental burns by the wire a retractable shield 74 is provided. The shield 74, in the illustrated embodiment, is comprised of a narrow panel 76 extending along the left-hand edge of the cover with inwardly extending ears 78 and 80 at each end thereof hinged to the cover by means of pins 82 and 84. The shield in its lowered position, as shown in full line in FIG. 1 and in dotted line in FIG. 4, encloses the heated wire 72 sufficiently to prevent accidental contact by the operator. When the cover is pulled down during the heat-sealing operation, the shield bears against the upper wall of the heat-sealing station and is pivoted upwardly as suggested in FIG. 4. In this fashion, the heated wire is free to cut transversely through the film. Where employing high temperature film, such as aluminized materials, for example, which are not readily cut by a heated wire, cooperating cutting elements such as blades may be employed in place of the heated wire. The shield 78 may be spring-loaded to return it to its shielding position automatically each time the cover is raised.

As shown in FIG. 3, the cover also carries a control dial 86 by which the operator may pre-set the temperature of the platen according to the particular material being used.

Other controls employed in the heat-sealing station include an automatic timing system whereby the operator can control the duration of an operating cycle. The timing system includes an adjustable timing dial 88 mounted on a housing upper wall 90 at the left-hand end of the station 14 with an indicating light 92 adjacent to the dial 88. The timing system is actuated by means of a switch 94, best shown in FIG. 2, mounted to the rear of the wall 88 and positioned to be actuated by a hinge member 96 of the cover 58. Each time the cover is lowered into sealing position the switch 94 is closed to start a pre-set timing cycle. At the end of the cycle, the indicator light 92 is illuminated and the operator raises the cover to remove the now heat-sealed tray and replace it with a fresh tray. Another section of film is drawn over the top of the tray and the cover again lowered. The controls also include an ON-OFF switch 98 in front of the wall 40 and includes an indicator light 10 whereby the operator can quickly observe whether or not the system is operative.

Mounted transversely to the wall 90 is a guide rod 102 the rear end thereof fastened securely to the rear of the wall 90 and extending slightly above the surface of the wall 90 to permit the film 24 to be drawn thereunder. The rod 102 serves to guide the film properly into position for a heat-sealing operation.

Various modifications will appear to those skilled in the art. For example, the platen could be moved by means of an air cylinder in an automatic or semi-automatic mode. Also, the apparatus will accommodate pressure sensitive films which will adhere to a tray without the use of heat.

Having thus described the invention what we claim and desire to obtain by Letters Patent of the United States is:

1. Apparatus for heat-sealing a thermoplastic film onto a tray, comprising
   (a) a base,
   (b) a cradle mounted to said base and adapted to support a roll of said film,
   (c) guide means operatively associated with said cradle for preventing axial motion of said roll,
   (d) a heat-sealing station mounted to said base adjacent said cradle,
   (e) said station including a pair of relatively high elongated parallel side walls extending perpendicularly to the axis of said roll and along the path of film drawn from said roll,
   (f) a substantially flat die formed with an opening therethrough detachably mounted along the upper edges of said walls and adapted to receive a tray mounted in said opening,
   (g) a heatable platen mounted to said station for movement to and away from said die for heat-sealing a section of said film pulled over a tray mounted in said die,
   (h) said platen being substantially coextensive with the area defined by said side walls, and,
   (i) film severing means mounted to said platen and engageable with said film upon a movement of said platen against said die,
   (j) said film severing means including a heatable wire mounted adjacent an edge of said platen opposite said cradle.

2. Apparatus according to claim 1 including a shield movably mounted to said platen along said edge and partially enclosing said wire when said platen is lowered.

3. Apparatus according to claim 1 wherein said guide means includes a pair of arms each pivotally mounted at one end to said base, a clamping screw threaded to said base and each of said arms for clamping each arm in a fixed position, and a roller mounted upright on the opposite end of each arm for engaging of the opposite ends of a roll in said cradle.

4. Apparatus according to claim 1 wherein said cradle includes a pair of rotatably mounted parallel rollers.

5. Apparatus according to claim 1 including a rod mounted to said station substantially coplanar with said die and adjacent one edge thereof opposite said cradle for guiding film over said die.

6. Apparatus according to claim 1 including timing means associated with said station and control means responsive to a lowering of said platen for actuating said timing means.

7. Apparatus according to claim 1 wherein said platen includes a resilient stratum and heating elements substantially coextensive therewith.

References Cited

UNITED STATES PATENTS

| | | | |
|---|---|---|---|
| 3,271,214 | 9/1966 | Tabor | 156—583 |
| 3,354,605 | 11/1967 | Amberg et al. | 53—329 |
| 3,587,829 | 6/1971 | Sorensen | 53—329 |
| 2,644,151 | 6/1953 | Krueger | 156—583 |
| 2,918,767 | 12/1959 | Grinstead et al. | 53—373 |
| 3,378,991 | 4/1968 | Anderson | 53—329 |
| 3,488,472 | 1/1970 | Pizarro | 53—329 |

DOUGLAS J. DRUMMOND, Primary Examiner

U.S. Cl. X.R.

156—583; 53—329, 373